United States Patent
Takeshita et al.

(10) Patent No.: US 6,538,779 B1
(45) Date of Patent: Mar. 25, 2003

(54) OPTICAL SIGNAL MONITORING METHOD AND APPARATUS

(75) Inventors: Hitoshi Takeshita, Tokyo (JP); Hirofumi Shimomura, Tokyo (JP); Tatsuya Shiragaki, Tokyo (JP); Naoya Henmi, Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/332,930

(22) Filed: Jun. 14, 1999

(30) Foreign Application Priority Data

Jun. 15, 1998 (JP) .......................... 10-167152

(51) Int. Cl.⁷ ............................. H04B 10/08
(52) U.S. Cl. ..................................... 359/110
(58) Field of Search ................... 359/110, 158, 359/161, 194; 375/222, 226, 326, 327, 317

(56) References Cited

U.S. PATENT DOCUMENTS

| | | | |
|---|---|---|---|
| 3,721,959 A | 3/1973 | George ................. | 340/146.1 |
| 4,376,309 A | 3/1983 | Fenderson et al. ....... | 375/101 |
| 4,475,210 A | 10/1984 | Couch ................. | 375/10 |
| 4,580,263 A | 4/1986 | Watanabe et al. ....... | 371/5 |
| 5,896,392 A * | 4/1999 | Ono et al. ............ | 375/225 |
| 5,923,455 A * | 7/1999 | Rokugawa ............. | 359/158 |
| 6,220,949 B1 * | 3/2001 | Ishikawa et al. ....... | 359/135 |

FOREIGN PATENT DOCUMENTS

| | | |
|---|---|---|
| EP | 0802697 | 10/1997 |
| JP | 53-15175 | 2/1978 |
| JP | 53-105905 | 9/1978 |
| JP | 61-29243 | 2/1986 |
| JP | 62-226739 | 10/1987 |
| JP | 4-22238 | 1/1992 |
| JP | 4-315333 | 11/1992 |
| JP | 4-329738 | 11/1992 |
| JP | 5-75653 | 3/1993 |
| JP | 8-8833 | 1/1996 |
| JP | 8-102729 | 4/1996 |
| JP | 8-265375 | 10/1996 |

OTHER PUBLICATIONS

Miller C M: "High–speed Digital Transmitter Characterization Using Eye Diagram Analysis," Hewlett–Packard Journal, vol. 45, No. 4, Aug. 1, 1994, pp. 29–37, XP002001689, * p. 30, right–hand column, paragraph 3—paragraph 5 *, *p. 35, right–hand column, paragraph 3—p. 36, left–hand column, paragraph 3 *.

Japanese Office Action issued Mar. 1, 2000 in a related application and English translation of relevant portions.

ICC '97 Workshop on WDM Network Management, "Photonic Transport Network Architecture Employing Optical Path Concept," Oguchi et al., Montreal, Jun. 8–12, 1997.

Japanese Office Action issued Oct. 27, 2000 in a related application with English translation of relevant portions.

* cited by examiner

Primary Examiner—Leslie Pascal
Assistant Examiner—Dalzid Singh
(74) Attorney, Agent, or Firm—Dickstein, Shapiro, Morin & Oshinsky, LLP.

(57) ABSTRACT

A signal quality monitoring method with reliability is disclosed. After extracting a clock signal from the light signal, a decision region is set for each bit of the light signal. The decision region is defined by a plurality of threshold amplitudes corresponding respectively to threshold phases which are produced with respect to the clock signal. The quality of the light signal is monitored depending on whether an amplitude of the light signal falls into the decision region at timings of the N threshold phases.

15 Claims, 5 Drawing Sheets

OPTICAL SIGNAL MONITORING METHOD AND APPARATUS

BACKGROUND OF THE INVENTION

1. Field of the Invention

The present invention relates to optical signal monitoring techniques and in particular to a signal quality monitoring method and apparatus in an optical wavelength division multiplexing (WDM) network.

2. Description of the Related Art

One conventional method of monitoring the quality of a transmission signal is to monitor the code error ratio thereof by executing the parity error check of standardized overhead information which is provided in a transport frame in a new synchronous network such as SDH (Synchronous Digital Hierarchy).

Due to the recent vast increase in information transmission capacity, people desire an optical network using the wavelength division multiplexing (WDM) technology. This optical network using the WDM technology can provide communication services that do not depend on the signal transmission speed and format, and is receiving a great attention for its transparency to the signal transmission speed and format.

To manage the quality of transmission signals in such an optical network, it is necessary to monitor the quality of transmission signals using a method suitable for the optical network, as in the case of the new synchronous network. One of such methods has been proposed in, for example. International Conference on Communication held in 1997, entitled "Photonic Transport Network Architecture employing Optical Path Concept," Kimio Oguchi and et al., ICC' 97 workshop, Jun. 8–12, 1997. It is to monitor the code error ratio by performing the parity error check of standardized overhead information which is provided in a transport frame, as in the case of the new synchronous network.

The aforementioned prior art however suffers the following problems. The first problem is the necessity to always affix standardized overhead information into a transmission signal. This restricts the format of a transmission signal, disabling to make the best use of the transparency of an optical network using the WDM technology. The second problem lies in the indirect monitoring method because a transmission light signal is not directly monitored itself, but rather monitoring is implemented by checking bit parity in the overhead information.

There has been proposed a digital data receiver which can detect fault occurrence of a transmission line or a transmitter without the need of a complicated parity detector (see Japanese Patent Unexamined Publication No. 61-29243).

More specifically, the digital data receiver is provided with first and second decision circuits and an exclusive-OR circuit connected to the output terminals of the first and second decision circuits. The first decision circuit is provided with a first comparator and a first flip-flop circuit clocked by a clock signal extracted from the input signal. The first comparator compares an input signal with a first reference voltage which is set so as to minimize the bit error rate thereof. The output of the first comparator is output to the first flip-flop circuit. The second decision circuit is provided with a second comparator and a second flip-flop circuit clocked by the clock signal extracted from the input signal. The second comparator compares the input signal with a second reference voltage differences from the first reference voltage. The output of the second comparator is output to the second flip-flop circuit.

When the voltage level of the input signal drops below the first reference voltage, the outputs of the first and second flip-flop circuits do not coincide and such a mismatch is detected by the exclusive OR-circuit.

The conventional digital data receiver, however, use the first and second comparators to monitor a change in amplitude of the input signal.

SUMMARY OF THE INVENTION

It is an object of the present invention to provide a signal monitoring method and apparatus, which can provide more reliable light transmitting/receiving capability to an optical network.

According to an aspect of the present invention, a method for monitoring quality of a light signal having a data transmission rate in an optical network, comprising the steps of: a) extracting a clock signal from the light signal; b) setting a decision region for each bit of the light signal, wherein the decision region is defined by a plurality of threshold amplitudes corresponding respectively to threshold phases which are produced with respect to the clock signal; and c) monitoring the quality of the light signal depending on whether an amplitude of the light signal falls into the decision region at timings of the N threshold phases.

The step b) comprises the steps of: producing N (N in an integer greater than 1) threshold phases with respect to the clock signal, wherein the N threshold phases provide different timings for each bit of the light signal: and producing N threshold amplitudes which correspond to the N threshold phases, respectively.

The step c) preferably comprises the steps of: comparing an amplitude of the light signal with the N threshold amplitudes at timings of the N threshold phases to produce comparison results, respectively: counting error bits for a predetermined time period based on the comparison results; and monitoring the quality of the light signal by comparing a count of the error bits with a predetermined value.

When the count of the error bits is greater than the predetermine value, a signal quality degradation alarm may be generated.

According to another aspect of the present invention, an apparatus includes a light receiver for receiving the light signal to produce an input signal which is an electric signal corresponding to the light signal; N bit decision circuits for making a bit decision with respect to different decision thresholds for each bit of the input signal to produce N bit decision results, respectively; and a monitor for monitoring the quality of the light signal based on the N bit decision results. Each of the N bit decision circuits comprises: a clock recovery circuit for extracting a clock signal from the input signal; a phase shifter for phase-shifting the clock signal by a predetermined amount to produce a phase-shifted clock signal; and a bit discriminator for making a binary discrimination of an amplitude of the input signal with respect to a predetermined threshold voltage at timing of the phase-shifted clock signal to produce a bit decision result, wherein a decision threshold is defined by the phase-shifted clock signal and the predetermined threshold voltage.

The bit discriminator may be a D-type flip-flop circuit having differential input terminals and at least one output terminals, wherein the input signal is applied to a first input terminal and the predetermined threshold voltage is applied to the second input terminal.

The monitor may count error bits for a predetermined time period based on the N decision results and determine the quality of the light signal by comparing a count of the error bits with a predetermined value.

According to further another aspect of the present invention, a fault recovery method in an optical network composed of a plurality of nodes each providing a plurality of paths, wherein a light signal having a data transmission rate is transmitted through a path of a node, comprising the steps of: at each of the nodes, a) extending a clock signal from the light signal; b) setting a decision region for each bit of the light signal, wherein the decision region is defined by a plurality of threshold amplitudes corresponding respectively to threshold phases which are produced with respect to the clock signal; c) monitoring the quality of the light signal depending on whether an amplitude of the light signal falls into the decision region at timings of the N threshold phases; and d) switching the path from a working path to a protection path when the quality of the light signal drops below a predetermined quality level.

According to still another aspect of the present invention, an extinction ratio of the light signal may be obtained. An apparatus includes a light receiver for receiving the light signal to produce an input signal which is an electric signal corresponding to the light signal and first and second bit decision circuits for making a bit decision with respect to different decision thresholds for each bit of the input signal to produce first and second bit decision results. Each of the bit decision circuits comprises: a clock recovery circuit for extracting a clock signal from the input signal; a phase shifter for phase-shifting the clock signal by a predetermined amount to produce a phase-shifted clock signal; and a bit discriminator for making a binary discrimination of an amplitude of the input signal with respect to a threshold voltage at timing of the phase-shifted clock signal to produce a bit decision result, wherein a decision threshold is defined by the phase-shifted clock signal and the threshold voltage. The apparatus further includes a logic circuit for calculating an exclusive OR or the bit decision results to produce an error bit; an error counter for counting error bits for a predetermined time period; a voltage controller for controlling the threshold voltage of each of the bit decision circuits so as to minimize a count of the error bits; and a circuit for calculating an extinction ratio obtained by dividing a first threshold voltage of the first bit decision circuit by a second threshold voltage of the second bit decision circuit.

DETAILED DESCRIPTION OF THE PREFERRED EMBODIMENTS

Figure 1:
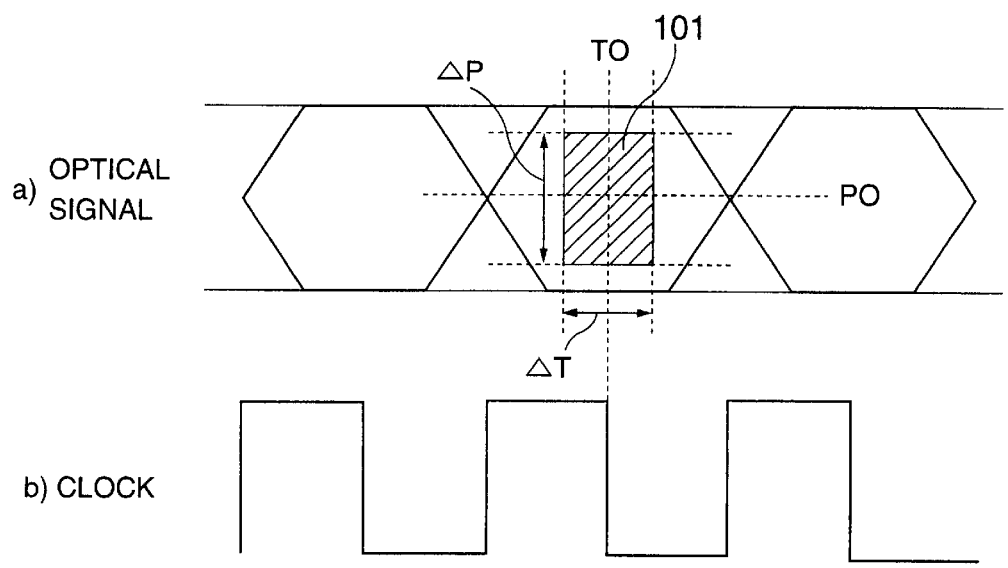
FIG. 1 is a waveform diagram for explaining a light signal monitoring method embodying the present invention.

As shown in FIG. 1, an amplitude threshold value P0 and a phase threshold value T0 are set to reproduce an optical digital signal received through an optical transmission line. Binary determination on whether or not the amplitude of the signal exceeds the threshold value is made with respect to the phase threshold value T0. According to the present invention, decision threshold widths of ΔP and ΔT around P0 and T0 are further set to form a rectangular decision region 101 for each bit.

Since transmission information is expressed in a binary form in ordinary light signal transmission, no bit should be detected within the rectangular region 101 given by ΔP and ΔT unless degradation of the transmission signal such as a degraded waveform occurs during light wave propagation or at the time of signal transmission. If a bit is detected within the rectangular region 101 given by ΔP and ΔT, therefore, this event can be considered as a transmission error which is caused by degradation of the quality of the transmission signal in light transmission.

If an information bit is detected within the rectangular region 101 defined by ΔP and ΔT, or if an information bit is detected only within the amplitude range in the direction of ΔP or only within the phase range in the direction of ΔT, this event is considered as a transmission error. It is to be noted that binary determination on whether or not the amplitude exceeds the threshold value may be performed on the acquired value with respect to the phase threshold value T0 that is obtained in the normal light communication, or correction which can be estimated from the obtained value may be made on that value and the resultant value may be treated as a decision value.

Figure 2:
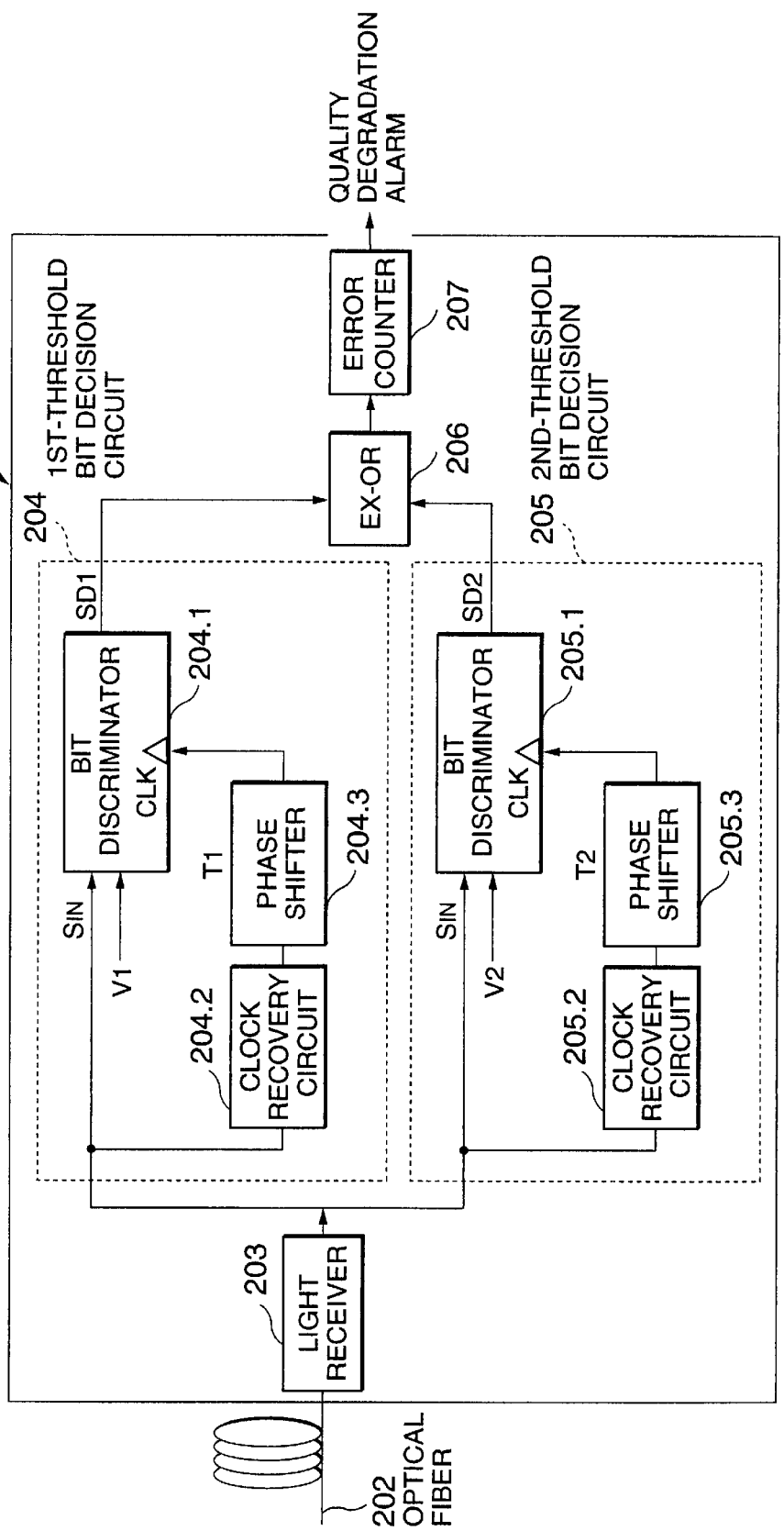
FIG. 2 is a block diagram illustrating a signal quality monitor according to a first embodiment of the present invention.

Referring to FIG. 2, a signal quality monitor 201 receives a desired light signal via an optical fiber 202 and monitors the quality of the input light signal and produces a quality degradation alarm when the quality of the input signal is degraded.

The signal quality monitor 201 is provided with a light receiver 203, first-threshold and second-threshold bit decision circuits 204 and 205, an exclusive-OR circuit 206 and an error counter 207. The light receiver 203 converts the input light signal to an electric signal (hereinafter, called an input signal $S_{IN}$) subjected to auto-gain control (AGC). The input signal $S_{IN}$ obtained by the light receiver 203 is output in common to the first-threshold and second-threshold bit decision circuits 204 and 205. Since the input signal $S_{IN}$ is subjected to automatic gain control (AGC) in the light receiver 203, the voltage level of the input signal is kept constant independently of the intensity level of the light signal.

The first-threshold bit decision circuit 204 determines whether the input signal has a high voltage level or a low voltage level, with respect to a first voltage amplitude threshold value V1 and a first phase threshold value T1. The second-threshold bit decision circuit 205 determines whether the input signal has a high voltage level or a low voltage level, with respect to a second voltage amplitude threshold value V2 and a second phase threshold value T2. As will be described later, the voltage amplitude threshold values V1 and V2 and the phase threshold values T1 and T2 define the rectangular region 101 as shown in FIG. 1.

The respective bit decision circuits 204 and 205 determines whether the input signal is higher/lower than the corresponding set threshold values, and outputs the decision results SD1 and SD2 to the exclusive-OR circuit 206. Since the exclusive-OR circuit 206 output a logical value 1 as an error bit to the error counter 207 when the decision results SD1 and SD2 do not coincide, the error counter 207 can calculate the number of error bits for a predetermined time period. If the error bit count per the predetermined time period exceeds a predetermined value, the error counter 207 produces the quality degradation alarm.

Although there are two error decision points that are determined by the bit decision circuits 204 and 205 in this case, the number of error decision points is not limited to two but may be three or greater. It is possible to provide the same number of error decision points as the number of bit decision circuits with different set threshold values. If three error decision points are provided, the result of an OR operation on the decision point 1 and decision point 2, for example, and the OR result and the decision point 3 are subjected to an exclusive OR operation, and then the number of errors within the predetermined time period is calculated by the error counter 207.

Degradation of the waveform of the light signal input to the signal quality monitor 203 can be monitored by comparison of each light signal bit with the voltage amplitude threshold value and the phase threshold value set in the signal quality monitor 203.

The first-threshold bit decision circuit 204 is composed of a bit discriminator 204.1, a clock recovery circuit 204.2 and a phase shifter 204.3. The bit discriminator 204.1 inputs the input signal $S_{IN}$ and the voltage amplitude threshold value V1 and produces the bit decision result SD1 according to a shifted clock signal produced by the phase shifter 204.3 which is set to the phase threshold value T1. The bit decision result SD1 changes in logical value depending on whether the input signal $S_{IN}$ is higher than the voltage amplitude threshold value V1. The clock recovery circuit 204.2 reproduces a clock signal from the input signal $S_{IN}$ using a PLL (Phase Locked Loop) circuit.

Similarly, the second-threshold bit decision circuit 205 is composed of a bit discriminator 205.2, a clock recovery circuit 205.2 and a phase shifter 205.3. The bit discriminator 205.1 inputs the input signal $S_{IN}$ and the voltage amplitude threshold value V2 and produces the bit decision result SD2 according to a shifted clock signal produced by the phase shifter 205.3 which is set to the phase threshold value T2. The decision result SD2 changes in logical value depending on whether the input signal $S_{IN}$ is higher than the voltage amplitude threshold value V2. The clock recovery circuit 205.2 reproduces a clock signal from the input signal $S_{IN}$ using a PLL circuit.

The use of the clock recovery technique employed in the clock recovery circuits 204.2 and 205.2 can allow a single signal quality circuit 201 to cope with various signal transmission rates. If the data transmission rate of a light signal to be input is previously determined (e.g. 600 Mb/s, 1.2 Gb/s, 2.5 Gb/s, 10 Gb/s or the like used in the new synchronous network), the circuit can be so designed as to deal with the signal transmission rate.

The operation of the signal quality monitor 201 according to this invention will now be discussed referring to FIGS. 1 and 2.

Referring to FIG. 2, if the voltage amplitude of the input signal $S_{IN}$ obtained by photoelectric conversion of a light signal in the light receiver 202 is used in place of the light intensity, the amplitude threshold value P0 and the phase threshold value T0 in the bit decision circuit 204 correspond to V1 and T1, respectively. Likewise, the amplitude threshold value P0 and the phase threshold value T0 in the bit decision circuit 205 corresponds to V2 and T2, respectively.

In other words, the respective decision threshold widths ΔP and ΔT defining the rectangular region 101 correspond to the absolute value |V2−V1| of the difference between V2 and V1 and the absolute value |T2−T1| of the difference between T2 and T1. This voltage amplitude threshold value can be arbitrarily set by adjusting the voltages V1 and V2 that are input to bit discriminators 204.1 and 205.1. The respective phase threshold values T1 and T2 can be arbitrarily set by the phase shifters 204.6 and 205.3 adjusting the phases of the recovered clocks. The shifted clocks are output to the bit discriminators 204.1 and 205.1, respectively.

Performing the exclusive OR of the outputs SD1 and SD2 of the bit decision circuits 204 and 205 can ensure binary determination on whether or not an information bit is detected within the rectangular region defined by ΔP and ΔT as shown in FIG. 1. Because this binary determination is carried out for each of information bits, quality monitoring does not require any overhead information, which is standardized for a parity error check on the preset frame structure as used in the new synchronous network. This enables the monitoring of the quality of a light signal which does not depend on the format of transmission light signal.

With the use of a clock recovery technique using PLL in clock recovery circuits 204.2 and 205.2, a single signal quality circuit can cope with various signal transmission rates. If the rate of transmitted signals to be input is previously determined (e.g., 60 Mb/s, 1.2 Gb/s, 2.5 Gb/s, 10 Gb/s or the like used in the synchronous network like SDH), the circuit can be so designed as to deal with the signal transmission rate.

Figure 3:
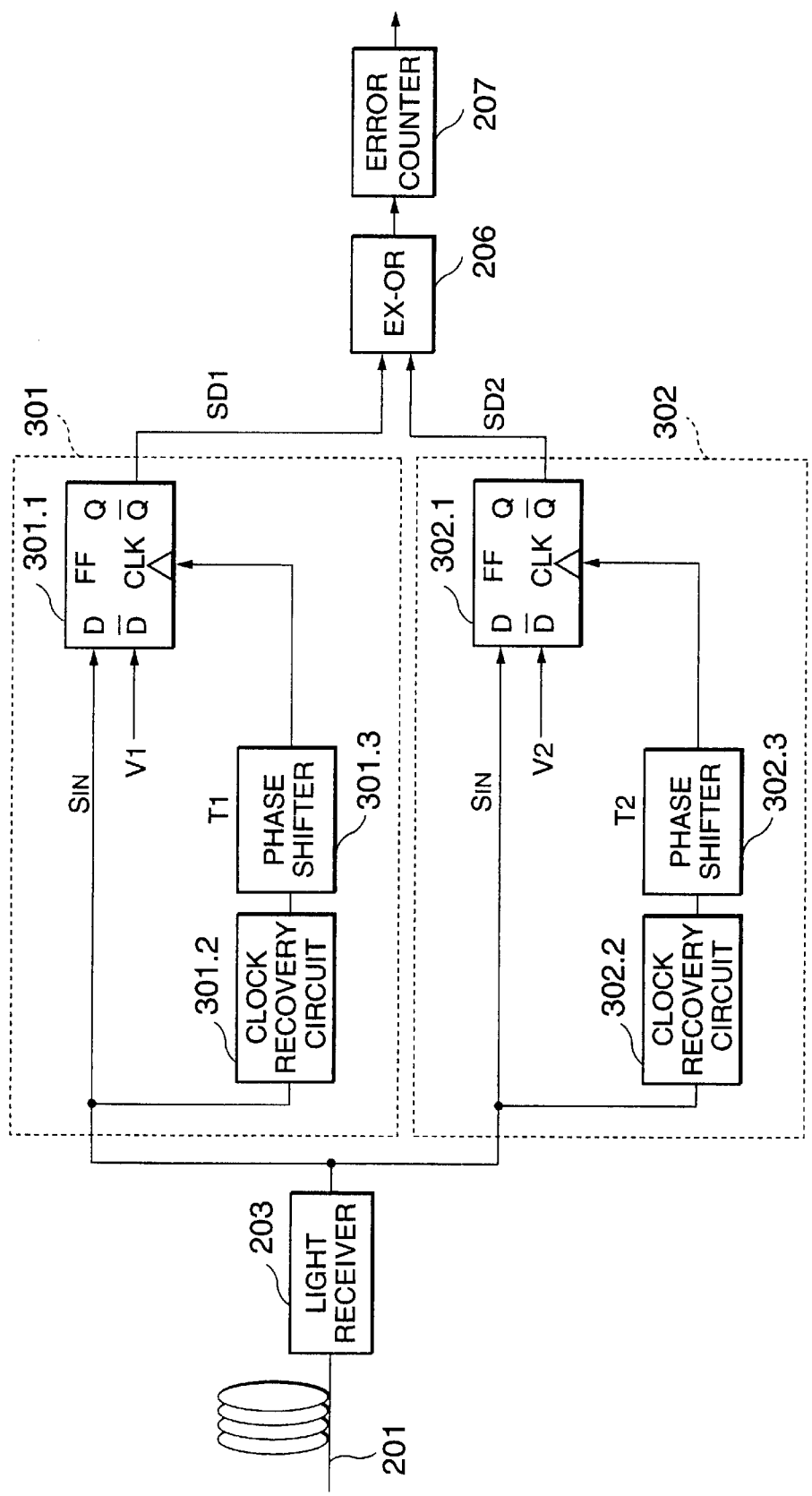
FIG. 3 is a block diagram showing one example of the first embodiment.

FIG. 3 is an example of the signal quality monitor 201, wherein circuit block similar to those previously described with reference to FIG. 2 are denoted by the same reference numerals and the details will be omitted. The signal quality monitor 201 of FIG. 3 is provided with a first-threshold bit decision circuit 301 and a second-threshold bit decision circuit 302.

The first-threshold bit decision circuit 301 is composed of a D-type flip-flop circuit 301.1 used as the bit discriminator 204.1 as well as a clock recovery circuit 301.2 and a phase shifter 301.3 which are the same as the clock recovery circuit 204.2 and a phase shifter 204.3.

The D-type flip-flop circuit 301.1 has non-inverting and inverting input terminals and non inverting and inverting output terminals. The D-type flip-flop circuit 301.1 inputs the input signal $S_{IN}$ at the non-inverting input terminal and the voltage amplitude threshold value V1 at the inverting input terminal. The D-type flip-flop circuit 301.1 outputs the bit decision result SD1 on the inverting output terminal according to the shifted clock signal produced by the phase shifter 301.3 which is set to the phase threshold value T1. More specifically, when the input signal $S_{IN}$ is not lower than the voltage amplitude threshold value V1 on the trailing edge of the shifted clock, the bit decision results SD1 on the inverting output terminal is low. When the input signal $S_{IN}$ is lower than the voltage amplitude threshold value V1 on the trailing edge of the shifted clock, the bit decision result SD1 on the inverting output terminal is high. Therefore, by adjusting the voltage amplitude threshold value V1. The D-type flip-flop circuit 301.1 serves as the bit discriminator 204.1.

Similarly, the D-type flip-flop circuit 303.1 has non-inverting and inverting input terminals and non-inverting and inverting output terminals. The D-type flip-flop circuit 302.1 inputs the input signal $S_{IN}$ at the non-inverting input terminal and the voltage amplitude threshold value V2 at the inverting input terminal. The D-type flip-flop circuit 302.1 outputs the bit decision result SD2 on the inverting output terminal according to the shifted clock signal produced by the phase shifter 302.3 which is set to the phase threshold value T2. More specifically, when the input signal $S_{IN}$ is not lower than the voltage amplitude threshold value V2 on the trailing edge of the shifted clock, the bit decision result SD2 on the inverting output terminal is low. When the input signal $S_{IN}$ is lower than the voltage amplitude threshold value V2 on the trailing edge of the shifted clock, the bit decision result SD2 on the inverting output terminal is high. Therefore, by adjusting the voltage amplitude threshold value V2, the D-type flip-flop circuit 302.1 serves as the bit discriminator 205.1.

Although the bit decision circuits 301 and 302 are identical circuits, different voltage amplitude threshold values V1 and V2 and different phase threshold values T1 and T2 are respectively set, so that the rectangular region 101 defined by $\Delta V$ (=|V2–V1|) in the direction of voltage amplitude and $\Delta T$ (=|T2–T1|) in the phase direction can be realized.

As the outputs SD1 and SD2 of the bit decision circuits 301 and 302 are subjected to the exclusive OR operation in the exclusive OR circuit 206, it is possible to determine if the input $S_{IN}$ lies in the range of $\Delta V$ in the direction of voltage amplitude and $\Delta T$ in the phase direction. More specifically, the output of the exclusive OR circuit 206 becomes a high level when the combination of the outputs SD1 and SD2 of the the bit decision circuits 301 and 302 is a high level and a low level or a low level and a high level, and the output of exclusive OR circuit 206 becomes a low level otherwise.

By computing the number of bits for the high-level output of the exclusive OR circuit 206, therefore, it is possible to monitor the number of bits of the light signal, input to the signal quality monitor 201 of FIG. 3, which falls within the range of $\Delta V$ and $\Delta T$.

Since transmission information is expressed in a binary form in the ordinary light signal transmission, no bit should be detected within the region 101 for each bit given by $\Delta V$ and $\Delta Y$ unless degradation of the transmission signal like a degraded waveform occurs at the time of light transmission or in propagation. If a bit is detected within the region 101 given by $\Delta V$ and $\Delta T$, then this event can be considered as a transmission error which is caused by degradation of the quality of the transmission signal.

As the signal quality monitor 201 is designed to monitor a light signal bit by bit, it is able to monitor degradation of the quality of the light signal independently of the format of transmission signals. Further, if a threshold value for the maximum error allowance is set in the error counter 207, this design can provide an interface which notifies quality degradation to a host controller only when bit errors greater in number than is allowed occur.

Figure 4:
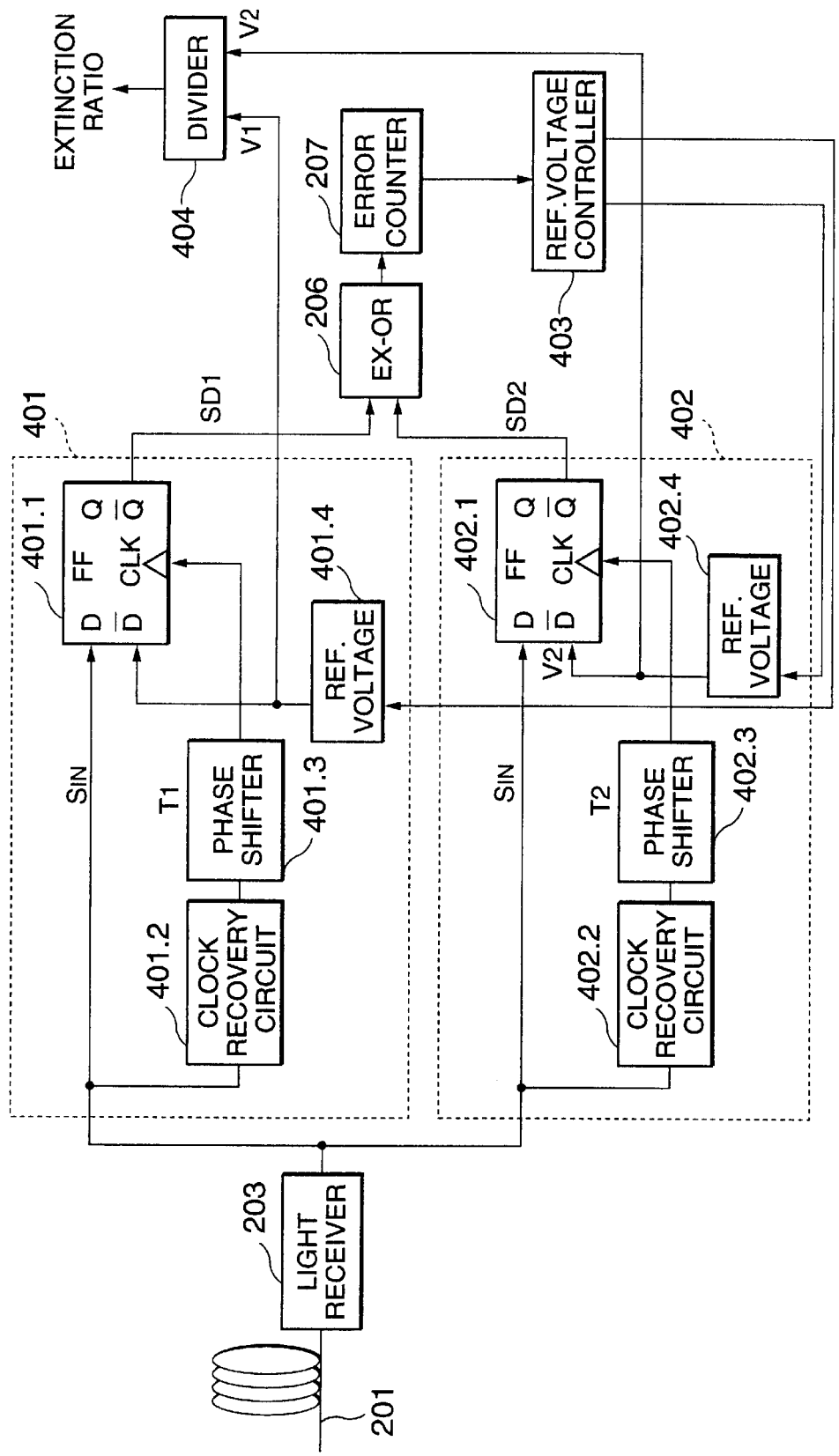
FIG. 4 is a block diagram illustrating a signal quality monitor according to a second embodiment of the present invention.

Referring to FIG. 4, another signal quality monitor 201 in accordance with the invention receives a desired light signal via an optical fiber 202 and monitors the quality of the input light signal and dynamically produces an extinction ratio of the light signal.

The signal quality monitor 201 is provided with the light receiver 203, first-threshold and second-threshold bit decision circuits 401 and 402, the exclusive-OR circuit 206 and the error counter 207. Further, the signal quality monitor 201 is provided with a reference voltage controller 403 and a divider 404.

The first-threshold bit decision circuit 401 determines whether the input signal has a high voltage level or a low voltage level, with respect to a first voltage amplitude threshold value V1 and a first phase threshold value T1. The second-threshold bit decision circuit 402 determines whether the input signal has a high voltage level or a low voltage level, with respect to a second voltage amplitude threshold value V2 and a second phase threshold value T2. The voltage amplitude threshold values V1 and V2 and the phase threshold values T1 and T2 define the rectangular region 101 as shown in FIG. 1.

The respective bit decision circuits 401 and 402 determines whether the input signal is higher/lower than the corresponding set threshold values, and outputs the decision results SD1 and SD2 to the exclusive-OR circuit 206. Since the exclusive-OR circuit 206 outputs a logical value 1 as an error bit to the error counter 207 when the decision results SD1 and SD2 do not coincide, the error counter 207 calculates the number of error bits for a predetermined time period. The resultant error count is output to the reference voltage controller 403. The reference voltage controller 403 uses the error count to control the respective voltage amplitude threshold values V1 and V2 of the respective bit decision circuits 401 and 402. Further, the controlled voltage amplitude threshold values V1 and V2 are output to the divider 404 and they are subjected to division to produce the extinction ratio of the light signal.

The bit decision circuit 401 is composed of a D-type flip-flop circuit 401.1, a clock recovery circuit 401.2, a phase shifter 401.3, and a reference voltage generator 401.4. The D-type flip-flop circuit 401.1, the clock recovery circuit 401.2 and the phase shifter 401.3 are the same as the D-type flip-flop circuit 301.1, the clock recovery circuit 301.2 and the phase shifter 301.3 as shown in FIG. 3 and therefore the details thereof will be omitted. The reference voltage generator 401.4 supplies the voltage amplitude threshold value V1 to the D-type flip-flop circuit 401.1 under the control of the reference voltage controller 403.

Similarly, the bit decision circuit 402 is composed of a D-type flip-flop circuit 402.1, a clock recovery circuit 402.2, a phase shifter 402.3, and a reference voltage generator 402.2, the D-type flip-flop circuit 402.1, the clock recovery circuit 402.2 and the phase shifter 402.3 are the same as the D-type flip-flop circuit 302.1, the clock recovery circuit 302.2 and the phase shifter 302.3 as shown in FIG. 3 and therefore the details thereof will be omitted. The reference voltage generator 402.4 supplies the voltage amplitude threshold value V2 to the D-type flip-flop circuit 402.1 under the control of the reference voltage controller 403.

If the output of the exclusive OR circuit 206 having a high level is taken as a bit error, for example, the number of errors is counted by the error counter 207 and the count result is output to the reference voltage controller 403. The reference voltage controller 403 performs feedback control on the voltage amplitude threshold values V1 and V2 of the bit decision circuits 401 and 402 in such a way as to minimize the error bit count obtained by the error counter 207.

As a result, the voltage amplitude threshold values V1 and V2 converge to voltage values equivalent to the high level and low level of the transmission light signal. The dynamic extinction ratio of the transmission light signal can be calculated by the divider 404 obtaining the ratio of the voltage values V1 and V2 equivalent to the high level and low level of the transmission light signal.

Figure 5:
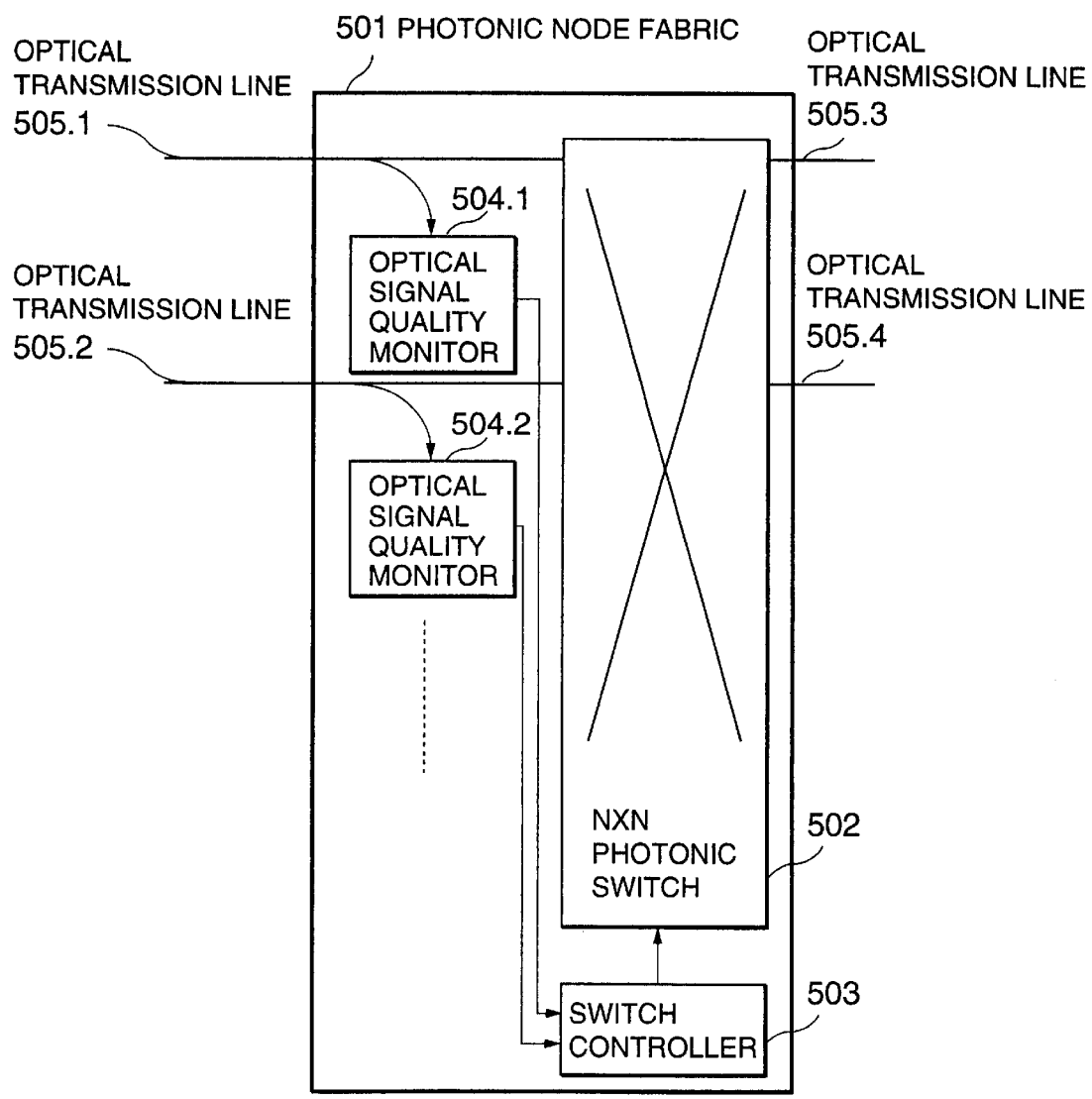
FIG. 5 is a block diagram illustrating a photonic node employing a signal quality monitor according to the present invention.

Referring to FIG. 5, a photonic node fabric 501 includes a N×N photonic switch 502, a switch controller 503, and N signal quality monitors 504.1 through 504.N connected to N optical transmission lines 505.1 through 505.N, respectively. Each of the N signal quality monitors is the same as a signal quality monitor as shown in FIG. 3. The switch controller 503 controls the photonic switch 502 to perform path switching based on the monitored signal quality results received from the N signal quality monitors 504.1 through 504.N.

Each signal quality monitor can monitor the quality of a light signal input to the photonic switch 502 and notify the result to the optical switch controller 503. The switch controller 503 can arbitrarily set the input/output connection statuses of the photonic switch 502.

Suppose that an optical transmission path 505.1 is connected to an output port 505.3 by the photonic switch 502. Also assume that the optical transmission path 505.1 is a working path while an optical transmission path 505.2 is a protection path. If, under this circumstance, the working path 505.1 can no longer provide a communication service due to an unexpected accident like disconnection of the optical fiber, then the associated signal quality monitor 504.1 notifies the non-availability of the communication service as a quality degradation alarm to the switch controller 503. In response to that alarm, the switch controller 503 switches the working path 505.1 to the protection path 505.2. This can ensure automatic recovery of the interrupted communication service. That is, the incorporated of the signal quality monitors in the optical node apparatus 501 can assure automatic recovery of a failure in an optical transmission path and can provide a highly reliable communication path.

There is no restriction to the logical formula for a logical operation on the outputs of a plurality of bit decision circuits, and the logical formula may be a logical sum (OR) or logical product (AND) besides the aforementioned exclusive OR operation.

The above signal quality monitor can be used to monitor the deformation of signal waveform as well as to monitor a bit error.

There are various ways available to receive a light signal to be monitored, such as a scheme of splitting a light signal from a main signal by means of a light splitter and receiving the light signal without terminating the main signal, or a scheme of terminating the main signal without being split.

In the case where a plurality of bit decision circuits are used, one can employ an appropriate way of distributing the electric signal to those bit decision circuits. In case of using two bit decision circuits, for example, a light signal is split into two which are in turn converted into electric signals by two associated light receivers. Alternatively, one light receiver may be used to convert a light signal into an electric signal and then electrically split the resultant electric signal into two to be respectively input to the two bit decision circuits.

As the quality of a desired light signal is directly monitored, bit by bit, in this invention, the quality of the waveform of a desired signal can be monitored without requiring standardized overhead information for such signal quality monitoring, which is employed in the new synchronous network. That is, the quality of transmission light signal can be monitored regardless of the format of the transmission light signal.

Since the ratio of the maximum voltage amplitude threshold value for error detection to the minimum voltage amplitude threshold value for error detection can be associated with a dynamic extinction ratio of a light signal, the dynamic extinction ratio can be obtained by adjusting the voltage amplitude threshold values V1 and V2 to be set.

According to the present invention, a clock can be reproduced from a light signal to be monitored by using the clock recovery technique using PLL and, if the rate of transmission signal to be input is previously determined (e.g., 600 Mb/s, 1.2 Gb/s, 2.5 Gb/s, 10 Gb/s or the like used in the new synchronous network, then the circuit can be so designed as to deal with the signal transmission rate. Therefore, the use of a single signal quality circuit is sufficient to cope with various signal transmission rates.

Further, since rounding or deformation of the waveform that represents an information bit can be monitored by adjusting the voltage amplitude threshold value and phase threshold value for error detection, it is possible to monitor the influence of deformation of the transmitted waveform.

Although the above-mentioned embodiments of the present invention have been described herein, it should be apparent to those skilled in the art that this invention may be embodied in many other specific forms without departing from the spirit or scope of the invention. Therefore, the present examples and embodiments are to be considered as illustrative and not restrictive and the invention is not to be limited to the details given herein, but may be modified within the scope of the appended claims.

What is claimed is:

1. A method for monitoring a quality of a light signal having a data transmission rate in an optical network, comprising the steps:

a) extracting a clock signal from the light signal;

b) setting a decision region for each bit of the light signal, wherein the decision region is defined by a plurality of threshold amplitudes corresponding respectively to threshold phases which are produced with respect to the clock signal; and c) monitoring the quality of the light signal depending on whether an amplitude of the light signal falls into the decision region.

2. The method according to claim 1, wherein the step b) comprises the steps of:

producing a plurality of threshold phases with respect to the clock signal, wherein the plurality of threshold phases provide different timings for each bit of the light signal; and producing a plurality of threshold amplitudes which correspond to the plurality of threshold phases, respectively.

3. The method according to claim 2, wherein the step c) comprises the steps of:

comparing an amplitude of the light signal with the plurality of threshold amplitudes at timings corresponding to the plurality of threshold phases to produce comparison results, respectively;

counting error bits for a period of time based on the comparison results; and monitoring the quality of the light signal by comparing a count of the error bits with a defined value.

4. The method according to claim 3, wherein in the counting step, an error bit is detected by a logical calculation of the comparison results.

5. The method according to claim 4, wherein the number of threshold phases and amplitudes is equal to 2 and the logical calculation is Exclusive-OR.

6. The method according to claim 3, wherein when the count of the error bits is greater the defined value, a signal quality degradation alarm is generated.

7. A fault recovery method in an optical network comprised of a plurality of codes each providing a plurality of paths, wherein a light signal having a data transmission rate is transmitted through a path of a node, comprising the steps of:

at each of the nodes,
a) extracting a clock signal from the light signal;
b) setting a decision region for each bit of the light signal, wherein the decision region is defined by a plurality of threshold amplitudes corresponding respectively to threshold phases which are produced with respect to the clock signal;
c) monitoring the quality of the light signal depending on whether an amplitude of the light signal falls into the decision region at timings of the threshold phases; and
d) switching the path from a working path to a protection path when the quality of the light signal drops below a defined quality level.

8. An apparatus for monitoring a quality of a light signal having a data transmission rate in an optical network, comprising:
   a light receiver for receiving the light signal and to produce an input signal which is an electric signal corresponding to the light signal;
   N bit decision circuits for making respective bit decisions with respect to decision thresholds for each bit of the input signal to produce N bit decision results, respectively; and
   a monitor for monitoring the quality of the light signal based on the N bit decision results,
   each of the N bit decision circuits comprising:
      a clock recovery circuit for extracting a clock signal from the input signal;
      a phase shifter for phase-shifting the clock signal by a defined amount to produce a phase-shifted clock signal; and
      a bit discriminator for making a binary discrimination of an amplitude of the input signal with respect to a threshold voltage at timings based on the phase-shifted clock signal to produce a bit decision result, wherein the decision thresholds are defined by the phase-shifted clock signal and the threshold voltage.

9. The apparatus according to claim 8, wherein the bit discriminator is a D-type flip-flip circuit having differential input terminals and at least one output terminal, wherein the input signal is applied to a first input terminal and the threshold voltage is applied to the second input terminal.

10. The apparatus according to claim 8, wherein the monitor counts error bits for a time period based on the N decision results and determines the quality of the light signal by comparing a count of the error bits with another threshold value.

11. The apparatus according to claim 10, wherein N-2 and the monitor monitors the quality of the light signal by performing an Exclusive-OR of the bit decision results.

12. The apparatus according to claim 10, wherein the monitor comprises an interface to a host controller for generating a signal quality degradation alarm when the count of the error bits is greater than another threshold value.

13. A photonic node in an optical network composed of a plurality of photonic nodes, the photonic node providing a plurality of paths, wherein a light signal having a data transmission rate is transmitted through a path of the photonic node, comprising:
   a light receiver for receiving the light signal and to produce an input signal which is an electric signal corresponding to the light signal;
   N bit decision circuits for making respective bit decisions with respect to decision thresholds for each bit of the input signal to produce N bit decision results, respectively;
   a monitor for monitoring the quality of the light signal based on the N bit decision results; and
   a switch controller for switching the path from a working path to a protection path when the quality of the light signal drops below a quality level,
   each of the N bit decision circuits comprising:
      a clock recovery circuit for extracting a clock signal from the input signal;
      a phase shifter for phase-shifting the clock signal by a defined amount to produce a phase-shifted clock signal; and
      a bit discriminator for making a binary discrimination of an amplitude of the input signal with respect to a threshold voltage at a timings based on the phase-shifted clock signal to produce a bit decision result, wherein the decision thresholds are defined by the phase-shifted clock signal and the threshold voltage.

14. An apparatus for monitoring a quality of a light signal having a data transmission rate in an optical network, comprising:
   a light receiver for receiving the light signal and to produce an input signal which is an electric signal corresponding to the light signal;
   first and second bit decision circuits for making respective bit decisions with respect to decision thresholds for each bit of the input signal to produce first and second bit decision results, each of the bit decision circuits comprising:
      a clock recovery circuit for extracting a clock signal from the input signal;
      a phase shifter for phase-shifting the clock signal by a defined amount to produce a phase-shifted clock signal; and
      a bit discriminator for making a binary discrimination of an amplitude of the input signal with respect to a threshold voltage at timings based on the phase-shifted clock signal to produce a bit decision result, wherein the decision thresholds are defined by the phase-shifted clock signal and the threshold voltage;
   a logic circuit for calculating an exclusive OR of the bit decision results to produce an error bit;
   an error counter for counting error bits for a defined time period;
   a voltage controller for controlling the threshold voltage of each of the bit decision circuits so as to minimize a count of the error bits; and
   a circuit for calculating an extinction ratio obtained by dividing the threshold voltage of the first bit decision circuit by the threshold voltage of the second bit decision circuit.

15. A method for monitoring a quality of a light signal having data, the method comprising:
   receiving the light signal;
   determining a clock rate of the light signal;
   for a particular bit of the light signal, defining a phase range during which the particular bit of the light signal should not have any data;
   for the particular bit of the light signal, defining a voltage range, the voltage range defining a range of voltages that the value of the particular bit of the light signal should not equal during the phase range; and
   determining the quality of the light signal based on whether the value of the particular bit is within the voltage range.

* * * * *